US012282906B2

United States Patent
Sugiyama et al.

(10) Patent No.: US 12,282,906 B2
(45) Date of Patent: Apr. 22, 2025

(54) TRANSACTION DATA PROCESSING APPARATUS CONNECTED TO AN EXTERNAL DEVICE FOR DATA COMMUNICATION

(71) Applicant: TOSHIBA TEC KABUSHIKI KAISHA, Tokyo (JP)

(72) Inventors: Koichi Sugiyama, Izunokuni Shizuoka (JP); Yasuhiro Arai, Mishima Shizuoka (JP); Tsuyoshi Gotanda, Ota Tokyo (JP); Keiichi Hasegawa, Kota Tokyo (JP); Kuniyoshi Yamada, Ota Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 106 days.

(21) Appl. No.: 17/665,083

(22) Filed: Feb. 4, 2022

(65) Prior Publication Data

US 2022/0156712 A1     May 19, 2022

Related U.S. Application Data

(63) Continuation of application No. 16/180,831, filed on Nov. 5, 2018, now abandoned, which is a (Continued)

(30) Foreign Application Priority Data

Sep. 4, 2014 (JP) .................................. 2014-180444
Sep. 4, 2014 (JP) .................................. 2014-180445

(51) Int. Cl.
*G06Q 20/20*     (2012.01)
*G06Q 20/04*     (2012.01)
*G07G 5/00*     (2006.01)

(52) U.S. Cl.
CPC ......... *G06Q 20/202* (2013.01); *G06Q 20/047* (2020.05); *G06Q 20/208* (2013.01); *G06Q 20/209* (2013.01); *G07G 5/00* (2013.01)

(58) Field of Classification Search
CPC .. G06Q 20/202; G06Q 20/047; G06Q 20/208; G06Q 20/209; G07G 5/00
(Continued)

(56) References Cited

U.S. PATENT DOCUMENTS 8,929,608 B2    1/2015   Takizawa
9,824,345 B2    11/2017   Chihara
(Continued)

FOREIGN PATENT DOCUMENTS

CN    1630302 A    6/2005
CN    1912537 A    2/2007
(Continued)

OTHER PUBLICATIONS

Turpin, Joanna R. Making a Decision on Mobile Devices. Air Conditioning, Heating & Refrigeration News; Troy vol. 248, Iss. 5, (Feb. 4, 2013): 14,16. (Year: 2013).*
(Continued)

*Primary Examiner* — Florian M Zeender
*Assistant Examiner* — Fawaad Haider
(74) *Attorney, Agent, or Firm* — Kim & Stewart LLP

(57) ABSTRACT

A transaction data processing apparatus includes a scanning unit configured to scan a product code of a product related to a transaction, a printing unit configured to print transaction data on a sheet, a communication unit configured to transmit the transaction data to an external device over a network, and a control unit. The control unit is configured to generate the transaction data based on the scanned product code, determine whether the network is online or offline, and control the communication unit to transmit the transaction
(Continued)

data to the external device when the network is online, and the printing unit to print the transaction data on the sheet when the network is offline.

14 Claims, 13 Drawing Sheets

Related U.S. Application Data continuation of application No. 16/137,179, filed on Sep. 20, 2018, now abandoned, which is a continuation of application No. 14/832,502, filed on Aug. 21, 2015, now abandoned.

(58) Field of Classification Search
USPC .......................................................... 705/21
See application file for complete search history.

(56) References Cited

U.S. PATENT DOCUMENTS

| | | | |
|---|---|---|---|
| 2005/0006468 A1 | 1/2005 | Fandel et al. | |
| 2006/0017938 A1 | 1/2006 | Ohtomo et al. | |
| 2007/0091174 A1 | 4/2007 | Kochi et al. | |
| 2007/0288322 A1 | 12/2007 | Watanabe | |
| 2008/0073432 A1 | 3/2008 | Barenburg et al. | |
| 2010/0322482 A1 | 12/2010 | Kochi et al. | |
| 2012/0084135 A1 | 4/2012 | Nissan | |
| 2012/0290609 A1* | 11/2012 | Britt | G06Q 20/326 707/769 |
| 2014/0058861 A1* | 2/2014 | Argue | G06Q 20/0457 705/18 |
| 2014/0092415 A1 | 4/2014 | Yokoyama | |
| 2014/0164193 A1 | 6/2014 | Ando et al. | |
| 2014/0236713 A1 | 8/2014 | Gotanda et al. | |
| 2014/0249951 A1* | 9/2014 | Gotanda | G06Q 30/0226 705/24 |
| 2014/0372198 A1* | 12/2014 | Goldfinger | G07G 1/14 705/14.33 |
| 2015/0002889 A1* | 1/2015 | Takamoto | G06F 3/1288 358/1.15 |
| 2015/0120478 A1* | 4/2015 | Jang | G06Q 20/3221 705/24 |
| 2016/0071080 A1 | 3/2016 | Sugiyama et al. | |
| 2019/0026714 A1 | 1/2019 | Sugiyama et al. | |
| 2019/0073649 A1 | 3/2019 | Sugiyama et al. | |

FOREIGN PATENT DOCUMENTS

| | | |
|---|---|---|
| CN | 102609838 A | 7/2012 |
| CN | 103085076 A | 5/2013 |
| CN | 105074732 A | 11/2015 |
| EP | 1607718 A2 | 12/2005 |
| EP | 1770356 A2 | 4/2007 |
| JP | H02191061 A | 7/1990 |
| JP | H09237312 A | 9/1997 |
| JP | 2003077064 A | 3/2003 |
| JP | 2003123144 A | 4/2003 |
| JP | 2004326662 A | 11/2004 |
| JP | 2005122262 A | 5/2005 |
| JP | 2005182180 A | 7/2005 |
| JP | 2007101276 A | 4/2007 |
| JP | 2009042931 A | 2/2009 |
| JP | 2011090375 A | 5/2011 |
| JP | 2011150460 A | 8/2011 |
| JP | 2011164934 A | 8/2011 |
| JP | 2012216042 A | 11/2012 |
| JP | 2014044468 A | 3/2014 |
| JP | 2014071647 A | 4/2014 |
| JP | 2014135102 A | 7/2014 |
| JP | 2014180444 A | 9/2014 |
| JP | 2015090751 A | 5/2015 |
| JP | 2016053909 A | 4/2016 |
| JP | 2017058048 A | 3/2017 |
| JP | 2018178723 A | 11/2018 |
| WO | 2014057645 A1 | 4/2014 |

OTHER PUBLICATIONS

Sharkey, Joe. Too Many Receipts? A Solution in Your Pocket: [Business/Financial Desk]. New York Times, Late Edition (East Coast); New York, N.Y. Apr. 24, 2012. (Year: 2012).*

Brennan, Gabriel. An Exploration of the Impact of Electronic Conveying (eConveyancing) upon Management of Risk in Conveyancing Transactions. Nottingham Trent University (United Kingdom). ProQuest Dissertations Publishing, 2012. (Year: 2012).

Japanese Office Action dated Dec. 22, 2020, mailed in counterpart Japanese Application No. 2019-223883, 4 pages (with translation).

Japanese Office action dated Jul. 31, 2018, filed in Japanese counterpart Application No. 2017-194532, 6 pages (with translation).

Extended European Search Report mailed Nov. 2, 2015 in corresponding European Patent Application No. 15183829.9 (Publication No. 2993634), 6 pages.

Notification of Reasons for Refusal mailed May 23, 2017 in corresponding Japanese Patent Application No. 2014-180445, 6 pages (with translation).

Chinese Office Action mailed Jun. 2, 2017, filed in Chinese counterpart Chinese Patent Application No. 201510558065.2, 11 pages (with translation).

Japanese Office Action dated Aug. 13, 2019, mailed in counterpart Japanese Application No. 2018-178723, 8 pages (with translation).

Chinese Office Action dated Mar. 19, 2020, mailed in counterpart Chinese Application No. 201810153916.9, 16 pages (with translation).

Dalton, Andrew Ryan. Analysis instrumentation, and visualization of embedded network systems: A testbed-based approach Clemson University. ProQuest Dissertations Publishing, 2008. (Year: 2008).

* cited by examiner

FIG. 12

D1 — COMPANY CODE:01
D2 — STORE CODE:001
D3 — TUES. JULY 22, 2014 10:30
D4 — TRANSACTION No.0001
D5 — CASH REGISTER No.0001
D6 — PERSON IN CHARGE: ABC

D9 — SRID
D10 — 9912345678901111

D7 — {
MERCHANDISE 1           100 YEN
MERCHANDISE 2           200 YEN
MERCHANDISE 3           300 YEN

TOTAL                   600 YEN

DEPOSIT AMOUNT         1000 YEN
CHANGE AMOUNT           400 YEN
}

TRANSACTION DATA PROCESSING APPARATUS CONNECTED TO AN EXTERNAL DEVICE FOR DATA COMMUNICATION

CROSS-REFERENCE TO RELATED APPLICATIONS

This application is a continuation of U.S. patent application Ser. No. 16/180,831, filed on Nov. 5, 2018, which is a continuation of U.S. patent application Ser. No. 16/137,179, filed on Sep. 20, 2018, which is a continuation of U.S. patent application Ser. No. 14/832,502, filed on Aug. 21, 2015, now abandoned, which is based upon and claims the benefit of priority from Japanese Patent Application Nos. 2014-180444 and 2014-180445, filed Sep. 4, 2014, the entire contents of each of which are incorporated herein by reference.

FIELD

Embodiments described herein relate generally to a transaction data processing apparatus, in particular, a transaction data processing apparatus connected to an external device for data communication.

BACKGROUND

A transaction data processing apparatus in an electronic receipt system transmits electronic data of a transaction at a store (i.e., an electronic receipt) to a computing device of a customer, instead of or in addition to printing a conventional paper receipt.

The electronic receipt is useful to the customer, because the customer can manage his or her transactions electronically. Further, the electronic receipt is useful to the store, because the store can reduce paper usage and with full conversion, will not need to invest in machines that issue the paper receipt. In addition, providing electronic receipts instead of paper receipts may reduce the time necessary to carry out settlement processing for the transaction.

The transaction data processing apparatus is connected to the electronic receipt system generally via a network such as a private network. When an error occurs in the network, communication to or from the transaction data processing apparatus is in an offline state. In such a case, the electronic receipt cannot be properly delivered to the computing device of the customer. Therefore, the customer cannot check the content of the transaction on the computing device.

DESCRIPTION OF THE DRAWINGS

FIGS. 12 and 13 each are a schematic diagram showing an example of receipt information according to the first embodiment.

DETAILED DESCRIPTION

In general, according to an embodiment, a transaction data processing apparatus includes a scanning unit configured to scan a product code of a product related to a transaction, a printing unit configured to print transaction data on a sheet, a communication unit configured to transmit the transaction data to an external device over a network, and a control unit. The control unit is configured to generate the transaction data based on the scanned product code, determine whether the network is online or offline, and control the communication unit to transmit the transaction data to the external device when the network is online, and the printing unit to print the transaction data on the sheet when the network is offline.

First Embodiment

Figure 1:
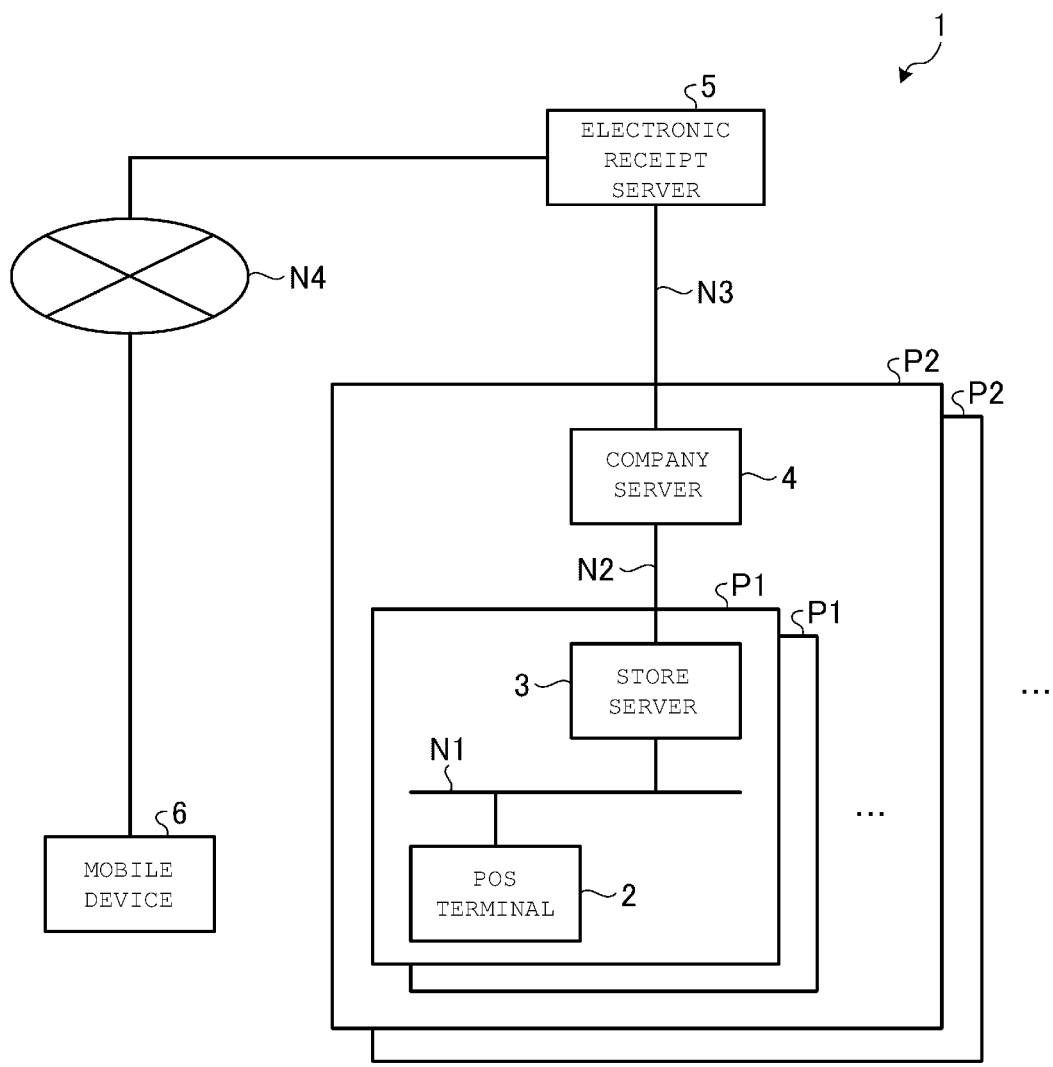
FIG. 1 illustrates an electronic receipt system according to a first embodiment.

FIG. 1 illustrates a configuration example of an electronic receipt system according to a first embodiment. As shown in FIG. 1, an electronic receipt system 1 includes POS terminals 2, store servers 3, company servers 4, an electronic receipt server 5, and a mobile device 6.

The POS terminals 2 and the store servers 3 are located in each of stores P1. The POS terminal 2 and the store server 3 in each store P1 are connected via a network N1 such as local area network (LAN) so as to communicate with each other. The POS terminal 2 and the store server 3 are connected to a network N2 that connects the stores P1 and the company server 4 through a network device (not shown) such as a router connected to the network N1. The network N2 is a private network such as the Internet or a virtual private network (VPN).

The POS terminal 2 functions as a printing control device in the present embodiment. The POS terminal 2 performs processes related to various transactions such as merchandize sales registration, and generates receipt information indicating the transaction content thereof. The POS terminal 2 outputs a sheet receipt by printing the generated receipt information by a printer 23. The POS terminal 2 generates electronic receipt information obtained by converting a data format of the receipt information and outputs (transmits) the generated information to the electronic receipt server 5 through the store server 3.

The store server 3 generally manages a merchandise sales data process performed in the POS terminal 2. For example, the store server 3 transmits the electronic receipt information generated in the POS terminal 2 to the company server 4 at a predetermined timing. The store server 3 stores and manages a merchandise master used in the merchandise sales data process or a company membership master.

The number of POS terminals 2 in each store P1 is not particularly limited, and may be plural. Although it is described in the present embodiment that the POS terminal 2 outputs the electronic receipt information, the present embodiment is not limited thereto. For example, the store server 3 or a non-illustrated conversion device may convert the receipt information generated in the POS terminal 2 into electronic receipt information, and may output the converted information to the electronic receipt server 5.

The company servers 4 are respectively provided in companies P2 that operate the stores P1. The company server 4 and the respective stores P1 of the company are connected through the network N2 so as to communicate with each other. The company servers 4 and the electronic receipt server 5 are connected via a network N3 such as the Internet or a VPN so as to communicate with each other.

The company server 4 has functions such as sales management, sales analysis, and inventory management of the company. The company server 4 receives the electronic receipt information transmitted from the respective stores P1 via the network N2. The company server 4 transmits the electronic receipt information of the respective stores P1 to the electronic receipt server 5 via the network N3. The company server 4 transmits (sends) the company membership master, which is received from the electronic receipt server 5 to the store servers 3 of the respective stores P1 via the network N2.

The electronic receipt server 5 collectively manages the electronic receipt information of the respective companies P2. The electronic receipt server 5 stores and manages membership data of the respective customers (members) registered in the electronic receipt system in a membership master. Here, the membership data of a member includes a first identification code, name, and transmission destination information of the mobile device 6 (for example, an electronic mail address), which is a transmission destination of the electronic receipt information. The electronic receipt server 5 stores and manages a second identification code in correlation with the first identification code for which correlation registration has been performed (to be described below).

The electronic receipt server 5 extracts data indicating a correlation relationship between the first identification code and the second identification code from the membership data stored in the membership master for each company. The electronic receipt server 5 provides (transmits) the extracted data as the company membership master to the company server 4 of the corresponding company.

The electronic receipt server 5 receives the electronic receipt information transmitted from the respective stores P1 via the network N3, and stores and manages the received information in an electronic receipt managing region. More specifically, the electronic receipt information includes an element such as the first identification code in addition to the transaction content, and is managed in correlation with the corresponding membership data.

When the electronic receipt information is stored in the electronic receipt managing region, the electronic receipt server 5 specifies a transmission destination (mobile device 6) by referring to the transmission destination information correlated with the first identification code of the electronic receipt information. The electronic receipt server 5 provides (transmits) the electronic receipt information stored in the electronic receipt managing region to the transmission destination thereof via the network N4. When an electronic receipt inquiry that designates the first identification code is received from the mobile device 6, the electronic receipt server 5 extracts the electronic receipt corresponding to the first identification code from the electronic receipt managing region, and provides (transmits) the extracted receipt to the mobile device 6.

The mobile device 6 is a computing device carried by a user (customer) of the electronic receipt system. Examples of the mobile device 6 include a smartphone, a mobile telephone, personal digital assistant (PDA), and a tablet computer. The mobile device 6 has applications such as a Web browser for browsing various kinds of information provided over the network N4. A larger computing device such as a desktop or notebook PC may be used in place of the mobile device 6.

The mobile device 6 performs membership registration to the electronic receipt system by accessing the electronic receipt server 5 via the network N4. Here, the network N4 is the internet or various public networks.

The membership registration to the electronic receipt system is performed according to the following processes, for example. The customer transmits a blank mail to the electronic receipt server 5 using the mobile device 6. The electronic receipt server 5 transmits a uniform resource locator (URL) of a page for the membership registration to the received mail address. The customer accesses the page for the membership registration from the mobile device 6 using the received URL, and the mobile device 6 displays an input screen for inputting information (name, and transmission destination information) necessary for the membership registration. After the necessary information is input by the customer, the electronic receipt server 5 performs the membership registration on the membership master. Thereafter, the electronic receipt server 5 distributes a membership registration completion mail including the first identification code to the mobile device 6. In this manner, the membership registration is performed.

Figure 2:
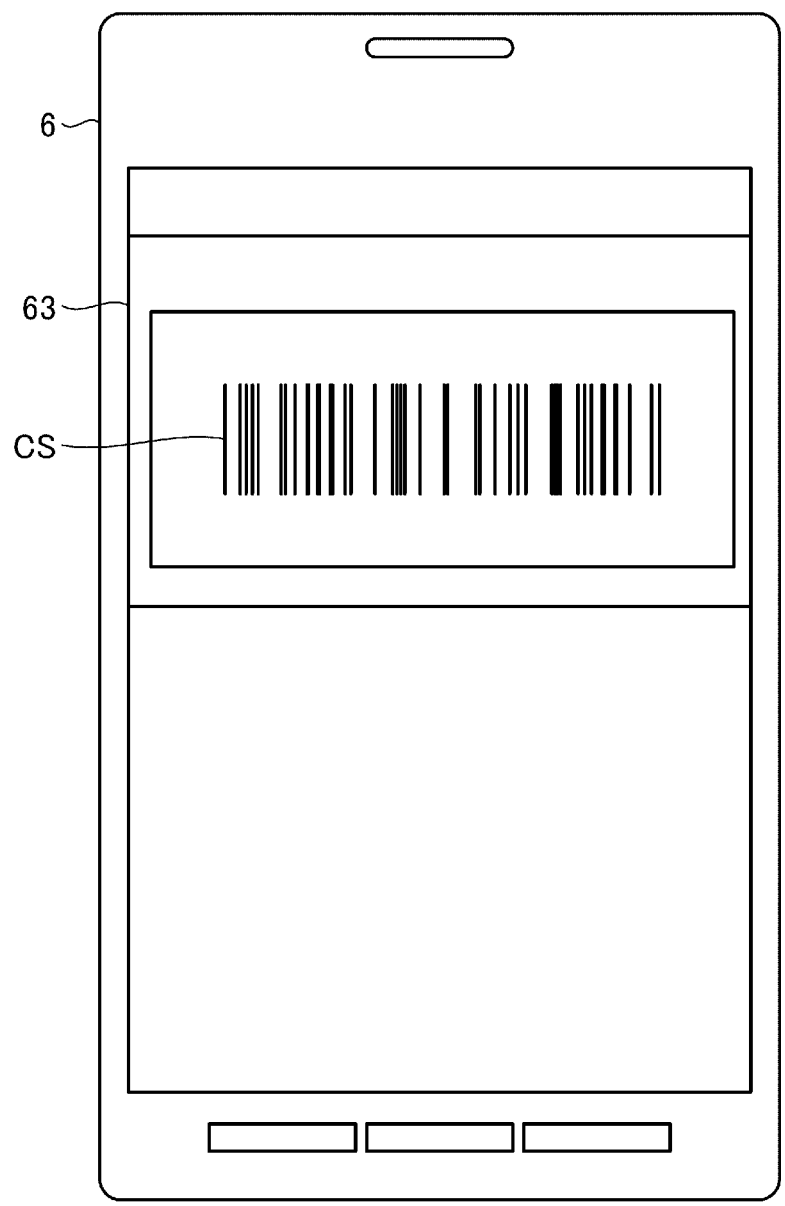
FIG. 2 illustrates a first identification code displayed on a mobile device according to the first embodiment.

After such membership registration, the mobile device 6 displays the first identification code of the customer as a code symbol CS such as a barcode or a two-dimensional code on a display unit 63, as shown in FIG. 2. The customer presents the code symbol CS displayed on the mobile device 6 to a salesperson at the time of a transaction in the store P1. The salesperson reads the code symbol CS displayed on the mobile device 6 using a code scanner 25 (see FIG. 3) connected to the POS terminal 2. Thus, it is possible to correlate the first identification code of the customer with the receipt information generated in the POS terminal 2 for the transaction.

After the transaction at the POS terminal 2 is performed, the mobile device 6 receives the electronic receipt information of the transaction from the electronic receipt server 5 via the network N4. The mobile device 6 receives the electronic receipt information related to the first identification code from the electronic receipt server 5 by transmitting the electronic receipt inquiry that designates the first identification code to the electronic receipt server 5. The mobile device 6 displays the received electronic receipt information on the display unit 63.

The first identification code may be correlated with the second identification code which is issued to each customer by each company. Here, the second identification code is, for example, a unique identification code retained in a card medium such as a point card distributed from the company. The second identification code is used to manage customers or manages points issued to each customer according to a purchase amount.

For example, when the first identification code is correlated with the second identification code of each company, the following processes are performed. The customer displays his or her first identification code as the code symbol CS on the display unit 63 of the mobile device 6. The customer presents the code symbol CS displayed on the mobile device 6 together with a card medium issued by the company that operates the store P1, to the sales person of the store P1. The salesperson reads the code symbol CS (first identification code) displayed on the mobile device 6 using the code scanner 25 (see FIG. 3) connected to the POS terminal 2. The salesperson reads the second identification code contained in the presented card medium using a card reader 26 (see FIG. 3) connected to the POS terminal 2. The POS terminal transmits the first identification code and the second identification code together with an identification code (company code) of the company P2 that operates the store P1 to the electronic receipt server 5 via the store server 3 and the company server 4. Thus, it is possible to correlate the second identification code issued to each customer by each company with the first identification code. Hereinafter, a process for correlating the first identification code with the second identification code is referred to as "correlation registration".

In the electronic receipt system 1, when a transaction is performed in the POS terminal 2 of the store P1, the receipt information (electronic receipt information) indicating the transaction content thereof is generated. The generated electronic receipt information is sent to the electronic receipt server 5 and then to the mobile device 6, and stored in and managed by the mobile device 6. The mobile device 6 that has a browsing application such as a Web browser can display the electronic receipt information.

Next, the configuration of major devices configuring the electronic receipt system 1 will be described.

Figure 3:
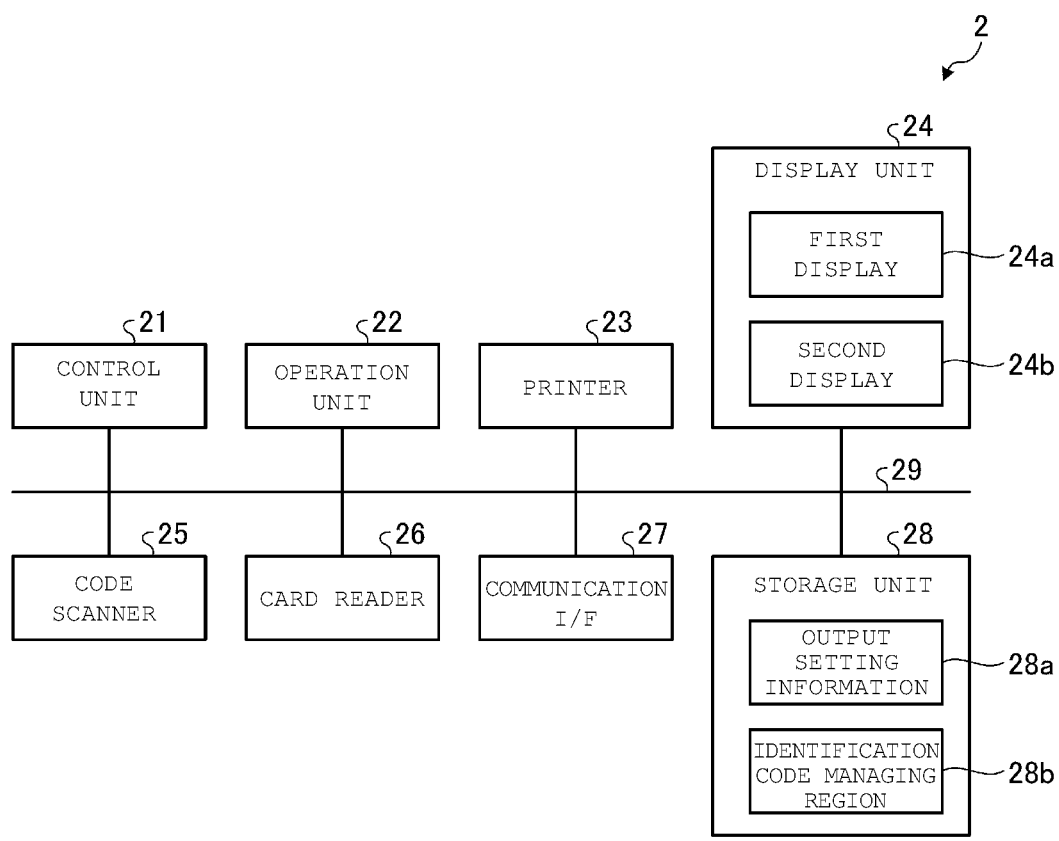
FIG. 3 is a block diagram of a POS terminal in the electronic receipt system according to the first embodiment.

First, the POS terminal 2 will be described. FIG. 3 is a block diagram of the POS terminal 2. As shown in FIG. 3, the POS terminal 2 includes a control unit 21 that controls various calculations or the respective units of the POS terminal 2. The control unit 21 is a computer (processor) that includes a central processing unit (CPU), a read only memory (ROM), a random access memory (RAM), and a real time clock (RTC). The ROM stores various programs and data. The random access memory (RAM) temporarily stores various programs or stores various data in a rewritable manner. The real time clock (RTC) tracks current date and time.

The control unit 21 is connected to an operation unit 22, the printer 23, a display unit 24, the code scanner 25, and the card reader 26 through a bus 29.

The operation unit 22 includes various operation keys for an operator to perform an operation input. Examples of the operation key include numeric keys for inputting numerical values, a cursor key or an enter key for selecting a predetermined item, and a subtotal key indicating the total price of merchandise for which sales registration has been performed in a transaction. Further, a transaction start key for declaring the start of a transactions and an end key for declaring the end of a transaction are provided.

The printer 23 is a printing device that prints a receipt or a journal. The printer 23 outputs a sheet receipt by printing the receipt information on a sheet such as a roll sheet under the control of the operation unit 22.

For example, the display unit 24 is a liquid crystal display or the like. The display unit 24 displays various kinds of information such as the name and price of merchandise for which sales registration has been performed, the total price of one transaction, and a change amount. The display unit 24 includes a first display 24a that displays various kinds of information to a cashier, and a second display 24b that displays various kinds of information to the customer. The display unit 24 may be a touch panel, and in this case, the touch panel functions as the operation unit 22.

The code scanner 25 is a scanner device that optically reads the code symbol such as a barcode or a two-dimensional code. For example, the code scanner 25 reads the code symbol assigned to the merchandise or the code symbol displayed on the mobile device 6, and outputs the read information to the control unit 21. A merchandise code of the merchandise is contained in the code symbol assigned to the merchandise. The code symbol displayed on the mobile device 6 contains the first identification code of a customer carrying the mobile device 6.

The card reader 26 is a reader device that reads information contained in a card medium. Examples of the card reader 26 include a magnetic card reader that magnetically reads the information contained in the card medium, and an IC card reader that reads the information using a short-range radio communication technology such as RFID. For example, the card reader 26 reads the second identification code from the card medium presented by the customer, and outputs the read information to the control unit 21.

The control unit 21 is connected to a communication interface (I/F) 27 through the bus 29. The control unit 21 is configured to be connected the network N1 or the network N2 through the communication I/F 27.

The control unit 21 is connected to a storage unit 28 through the bus 29. For example, the storage unit 28 is a secondary storage device such as a hard disk drive (HDD) or a solid state drive (SSD). The storage unit 28 stores various setting information and programs for performing various POS operations including the merchandise sales data process. The storage unit 28 stores an output setting information table 28a that indicates an output method of information regarding each transaction.

Figure 4:
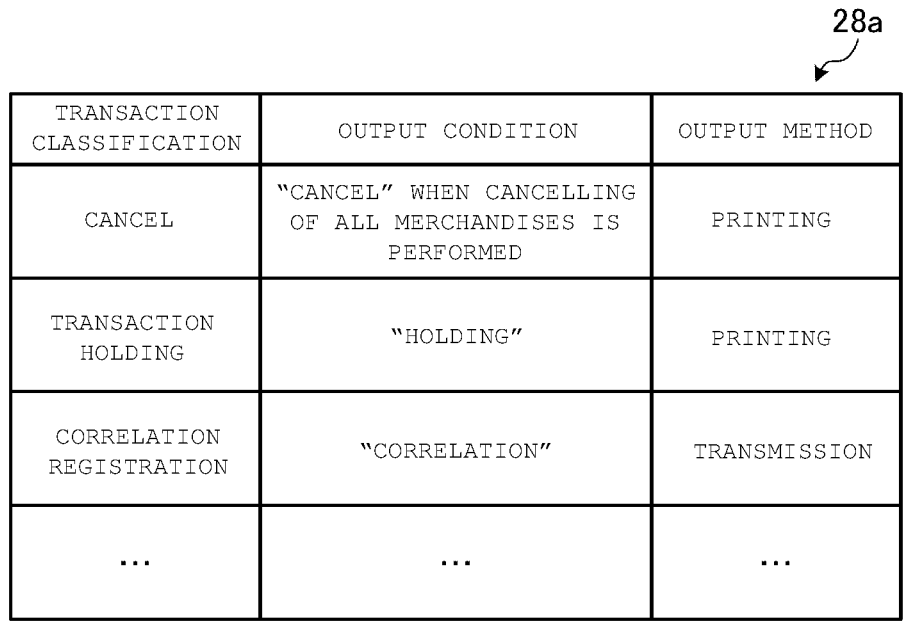
FIG. 4 illustrates an example of output setting according to the first embodiment.

FIG. 4 illustrates an example of the output setting information table 28a. As shown in FIG. 4, the output setting information table 28a includes columns of a transaction classification, an output condition, and an output method, respectively. A classification of the transaction performed in the POS terminal 2 is set in the column of "transaction classification". A condition according to the transaction classification, and a specific character string (hereinafter, referred to as a transaction character string) included in the receipt information when this condition is satisfied is set in the column of "output condition". An output method of the receipt information when the transaction character string set in the "output condition" is included in the receipt information is set in the column of "output method". Printing of the receipt information on the sheet corresponds to an output form of "sheet receipt". Transmission of the receipt information as the electronic receipt information to an external device corresponds to an output form of "electronic receipt".

For example, the following output condition and output method are set to "cancel" for cancelling the merchandise for which the registration has been completed. A setting that the transaction character string of "cancel" is included in the receipt information when all merchandises are cancelled is set to the output condition. When a character string of "cancel" is included in the receipt information, a setting that the receipt information is printed is set to the output method.

For example, the following output condition and output method are set to "transaction holding" for performing transaction holding. A setting fact that a transaction character string of "holding" is included in the receipt information when the "transaction holding" is performed is set to the output condition. When the character string of "holding" is included in the receipt information, a setting that the receipt information is printed is set to the output method.

For example, the following output condition and output method are set to "correlation registration" for performing the correlation registration of the second identification code. A setting that a transaction character string of "correlation" is included in the receipt information when the "correlation registration" is performed is set to the output condition. When the character string of "correlation" is included in the receipt information, a setting that the receipt information is transmitted as the electronic receipt is set to the output method.

The output setting information table 28a may be used when the output method is determined for each transaction. The setting content of the output setting information table 28a is not limited to the example of FIG. 4, and may be arbitrarily set. An output method of another transaction (for example, "sales transaction" for performing the merchandise sales registration) that is not registered in the output setting information table 28a may follow a default output setting (for example, printing) or another rule.

The storage unit 28 stores POS identification information of the POS terminal 2 in an identification code managing region 28b. For example, the POS identification information includes a POS number assigned to the POS terminal 2, a company code (identification code of the company that operates the store), and a store code of the store P1 where the POS terminal 2 is located. The company code (identification code of the company that operates the store) may be stored in the company server 4.

The control unit 21 performs a process related to transaction indicated by the operator, and generates receipt information according to the transaction. The control unit 21 determines the output method (output form) of the generated receipt information depending on whether or not a specific character string is included in the receipt information.

Figure 5:
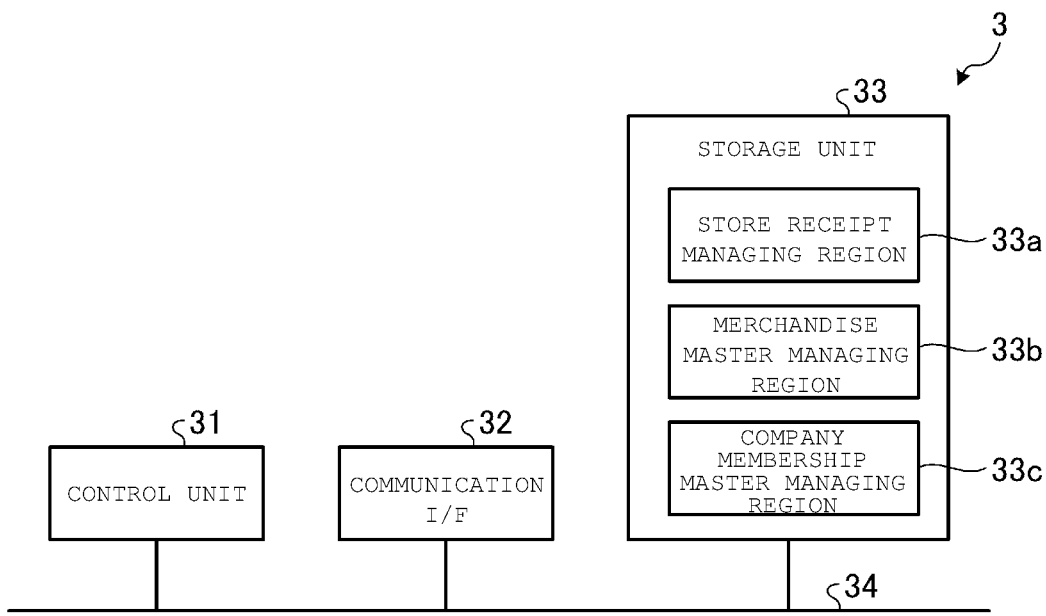
FIG. 5 is a block diagram of a store server in the electronic receipt system according to the first embodiment.

Next, the configuration of the store server 3 will be described with reference to a block diagram in FIG. 5. FIG. 5 is a block diagram of a configuration example of the store server 3. As shown in FIG. 5, the store server 3 includes a control unit 31 that generally controls various calculations or the respective units of the store server 3. The control unit 31 is a computer (processor) that includes a CPU, a ROM, a RAM, and a RTC.

The control unit 31 is configured to be connected to the network N1 or the network N2 through a communication I/F 32 connected to a bus 34. The control unit 31 is connected to a storage unit 33 through a bus 34.

The storage unit 33 stores various kinds of setting information or various programs that can be executed by the control unit 31. The storage unit 33 stores the receipt information generated in the POS terminals 2 of the store P1 in a store receipt managing region 33a. The storage unit 33 stores a merchandise master that includes merchandise data such as merchandise name, merchandise code, and unit price of merchandise, in a merchandise master managing region 33b. The storage unit 33 stores the company membership master in a company membership master managing region 33c. The merchandise master and the company membership master may be distributed to the POS terminal 2 of the store P1 at a predetermined timing.

When the company membership master is received from the company server 4, the control unit 31 stores the company membership master in the company membership master managing region 33c. The control unit 31 opens the merchandise master managing region 33b or the company membership master managing region 33c ensured in the storage unit 33 so as to be referred by the POS terminal 2 of the store. The control unit 31 collects the receipt information items generated in the POS terminals 2, and stores the collected information items in the store receipt managing region 33a. When the electronic receipt information is transmitted to the company server 4 via the store server 3, the control unit 31 transmits (sends) the electronic receipt information to the company server 4 when the electronic receipt information generated in the POS terminal 2 is received.

Figure 6:
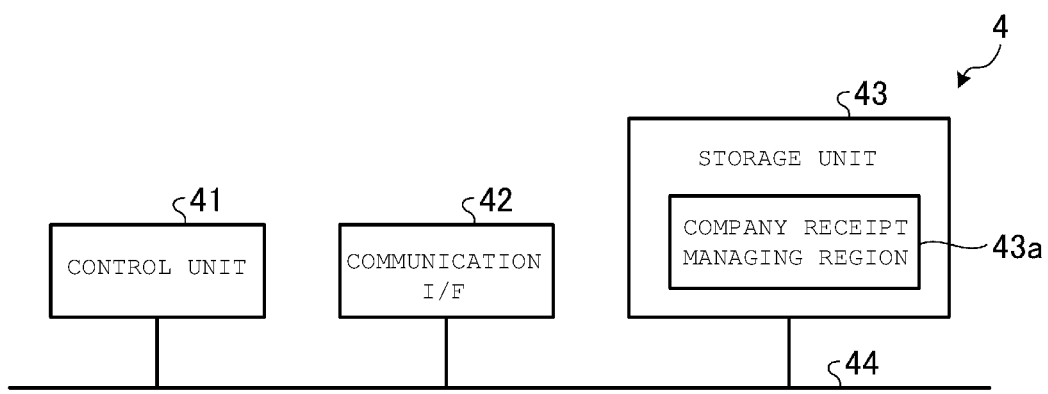
FIG. 6 is a block diagram of a company server in the electronic receipt system according to the first embodiment.

Next, the configuration of the company server 4 will be described with reference to a block diagram in FIG. 6. FIG. 6 is a block diagram of a configuration example of the company server 4. As shown in FIG. 6, the company server 4 includes a control unit 41 that controls various calculations or the respective units of the company server 4. The control unit 41 is a computer (processor) that includes a CPU, a ROM, a RAM, and a RTC.

The control unit 41 is configured to be connected to the network N2 or the Network N3 through a communication I/F 42 connected to a bus 44. The control unit 41 is connected to a storage unit 43 through the bus 44.

The storage unit 43 stores various setting information items or various programs that can be executed by the control unit 41. The storage unit 43 stores the electronic receipt information items transmitted from the stores P1 operated by the company in a company receipt managing region 43a.

When the company membership master is received from the electronic receipt server 5, the control unit 41 transmits (sends) the company membership master to the store server 3 of the store P1 operated by the company. When the electronic receipt information is received from the store (the POS terminal 2 or the store server 3) operated by the company, the control unit 41 stores the electronic receipt information in the company receipt managing region 43a. The control unit 41 transmits the electronic receipt information stored in the company receipt managing region 43a to the electronic receipt server 5 at a predetermined timing. Here, the timing at which the electronic receipt information is transmitted is not particularly limited. For example, the electronic receipt information may be transmitted whenever the electronic receipt information is stored in the company receipt managing region 43a. The electronic receipt information stored in the company receipt managing region 43a may be transmitted at a predetermined time interval such as once an hour.

Figure 7:
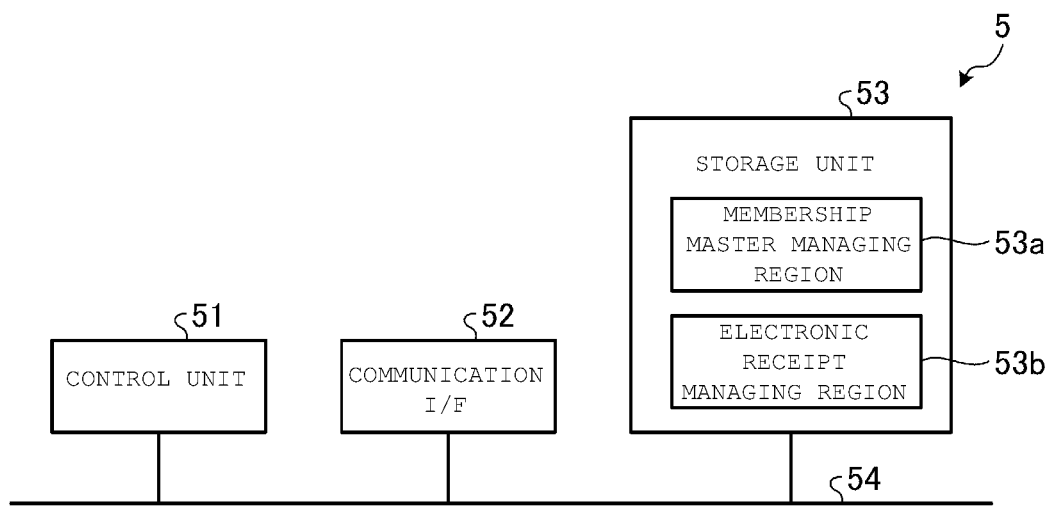
FIG. 7 is a block diagram of an electronic receipt server in the electronic receipt system according to the first embodiment.

Next, the configuration of the electronic receipt server 5 will be described with reference to a block diagram in FIG. 7. FIG. 7 is a block diagram showing a configuration example of the electronic receipt server 5. As shown in FIG. 7, the electronic receipt server 5 includes a control unit 51 that generally controls various calculations or the respective units of the electronic receipt server 5. The control unit 51 is a computer (processor) that includes a CPU, a ROM, a RAM, and a RTC.

The control unit 51 is configured to be connected to the network N3 or the network N4 through a communication I/F 52 connected to a bus 54. The control unit 51 is connected to a storage unit 53 through the bus 54.

The storage unit 53 stores various kinds of setting information or various programs that can be executed by the control unit 51. The storage unit 53 stores a membership master in a membership master managing region 53*a*.

Figure 8:
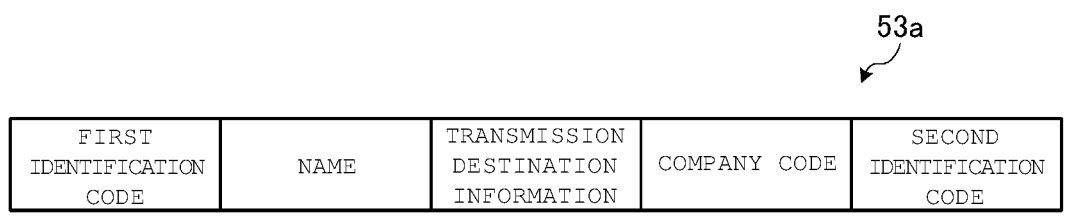
FIG. 8 illustrates an example of a data structure of a membership master managing region (membership master) stored in the electronic receipt server according to the first embodiment.

Here, FIG. 8 illustrates an example of a data structure of the membership master managing region 53*a* (membership master). As shown in FIG. 8, the membership master includes name and transmission destination information correlated with the first identification code of the member. The membership master also includes the first identification code of the member for which the correlation registration has been performed in correlation with the company code and the second identification code.

Figure 9:
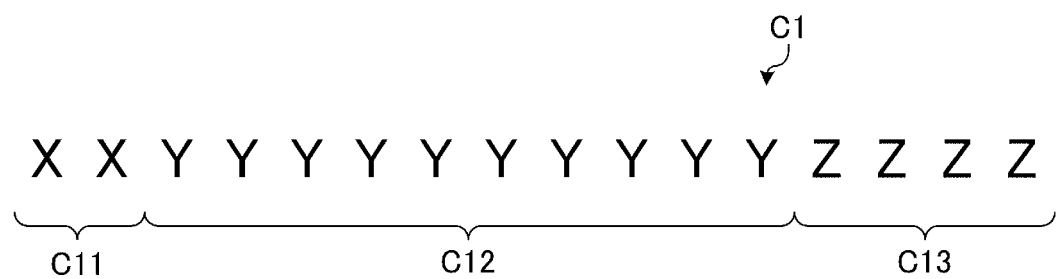
FIG. 9 illustrates an example of a format of a first identification code in the membership master.

For example, the first identification code represents a numerical value of a plurality of digits. Here, FIG. 9 illustrates an example of a format of the first identification code. In FIG. 9, the first identification code C1 is a numerical value of 16 digits.

The first identification code C1 includes three parts of a header part C11, a data part C12, and an option part C13. A specific numerical value (for example, "99") indicating that this code is the first identification code is included in the header part C11. A unique numerical value allocated to each member is included in the data part C12. A numerical value indicating various additional conditions is included in the option part C13. In FIG. 9, upper two digits represent the header part C11, the subsequent 10 digits represent the data part C12, and the last 4 digits represent the option part C13, but the number of digits of the respective parts is not limited thereto.

The storage unit 53 stores the electronic receipt information transmitted from the respective company servers 4 in the electronic receipt managing region 53*b*. More specifically, the electronic receipt managing region 53*b* is used to manage the electronic receipt information of each company that operates the stores for each member. The electronic receipt information includes the first identification code, the company code, the store code, the POS number, a receipt number, and the merchandise sales data (including date and time data).

When the electronic receipt information is received from the company server 4 of each company, the control unit 51 stores the electronic receipt information in the electronic receipt managing region 53*b*. When the electronic receipt information indicates the correlation registration, the control unit 51 registers the company code and the second identification code in correlation with the first identification code included in the electronic receipt information, in the membership master managing region 53*a*. The control unit 51 extracts data indicating the correlation relationship between the first identification code and the second identification code for each company (company code) from the membership maser managing region 53*a*. The control unit 51 transmits the extracted data as the company membership master to the company server 4 of the corresponding company.

When the electronic receipt information is stored in the electronic receipt information region 53*b*, the control unit 51 specifies a transmission destination by referring to the transmission destination information correlated with the first identification code of the electronic receipt information. The control unit 51 provides (sends) the electronic receipt information stored in the electronic receipt managing region 53*b* to this transmission destination. When an electronic receipt inquiry that designates the first identification code is received from the mobile device 6, the control unit 51 extracts the electronic receipt information corresponding to the first identification code from the electronic receipt managing region 53*b*. The control unit 51 operates to transmit the extracted electronic receipt information to the mobile device 6.

Figure 10:
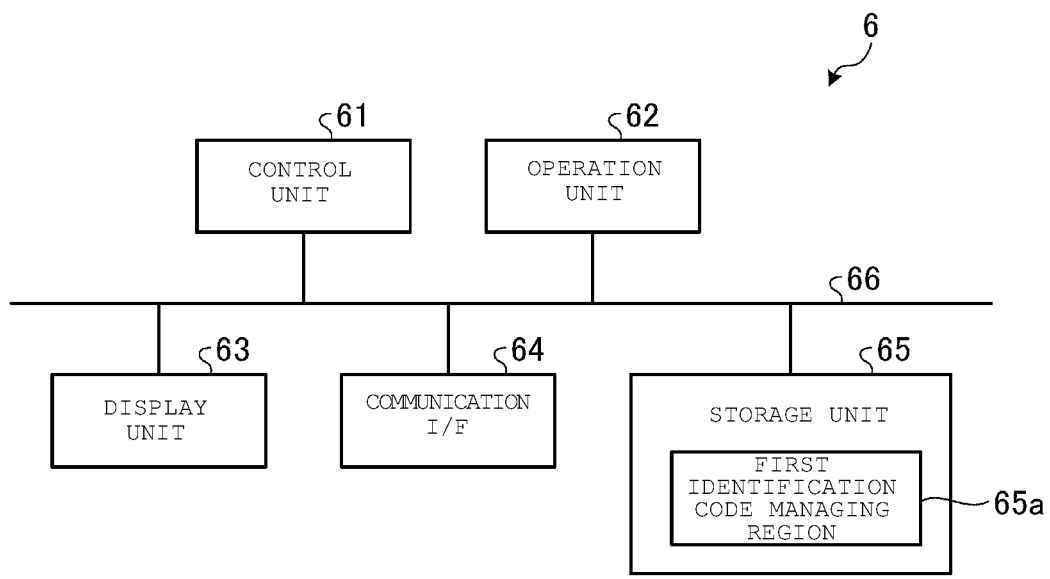
FIG. 10 is a block diagram of the mobile device in the electronic receipt system according to the first embodiment.

Next, the configuration of the mobile device 6 will be described with reference to a block diagram in FIG. 10. FIG. 10 is a block diagram of a configuration example of the mobile device 6. As shown in FIG. 10, the mobile device 6 includes a control unit 61 that generally controls various calculations or the respective units of the mobile device 6. The control unit 61 is a computer (processor) that includes a CPU, a ROM, a RAM and a RTC.

The control unit 61 is connected to an operation unit 62 and a display unit 63 through a bus 66. The operation unit 62 includes a pointing device and various operation keys for performing an operation input by a user (customer). The display unit 63 is, for example, a liquid crystal display, and displays various kinds of information including electronic receipt information. The display unit 63 maybe a touch panel, and in this case, the touch panel functions as the operation unit 62.

The control unit 61 is connected to a communication I/F 64 through the bus 66. The control unit 61 is configured to be connected to the network N4 through the communication I/F 64. The control unit 61 is configured to be connected to the network N1 through the communication I/F 64.

The control unit 61 is connected to a storage unit 65 through the bus 66. The storage unit 65 stores various kinds of setting information or various programs that can be executed by the control unit 61, such as a Web browser for browsing various information items (contents). The storage unit 65 stores the first identification code in a first identification code managing region 65*a*.

The control unit 61 receives the electronic receipt information of the transaction from the electronic receipt server 5. The control unit 61 receives the electronic receipt information correlated with the first identification code from the electronic receipt server 5 by transmitting the electronic receipt inquiry that designates the first identification code to the electronic receipt server 5. The control unit 61 displays the received electronic receipt information on the display unit 63.

Figure 11:
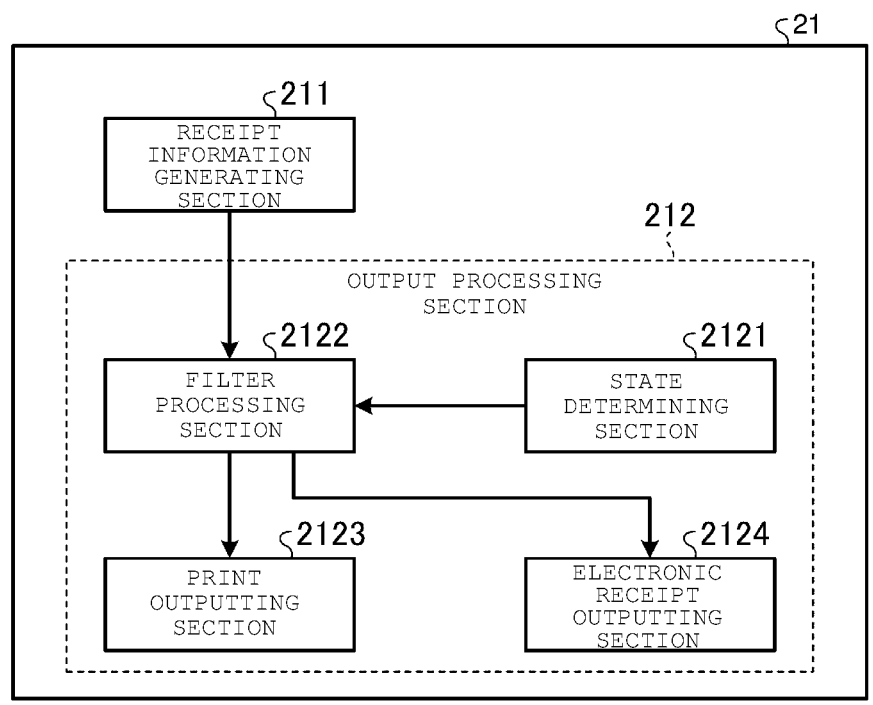
FIG. 11 is a block diagram of a functional configuration of a control unit in the POS terminal according to the first embodiment.

Next, the functional configuration of the control unit 21 of the POS terminal 2, which is the printing control device, according to the present embodiment will be described. As shown in FIG. 11, the CPU of the control unit 21 generates a receipt information generating section 211, and an output processing section 212, as functional sections, in cooperation with the programs stored in the ROM or the storage unit 28. Here, FIG. 11 is a block diagram of the functional configuration of the control unit 21.

The receipt information generating section 211 is a functional section that generates print data (receipt information) of various transactions and receipts. Specifically, when the start of the transaction is indicated through the transaction start key of the operation unit 22, the receipt information generating section 211 performs a process according to the transaction, and generates the print data according to the transaction.

For example, when the execution of the merchandise sales registration is indicated as the transaction classification, the receipt information generating section 211 obtains the merchandise code of the merchandise through the code scanner 25. Subsequently, the receipt information generating section 211 reads the merchandise data corresponding to the merchandise code from the merchandise master. The receipt information generating section 211 performs the merchandise sales data process to calculate a total price based on a unit prices included in the read merchandise data. The receipt information generating section 211 generates the receipt information indicating the statement of the transaction.

The receipt information generating section 211 adds the transaction character string according to the transaction classification being performed to the receipt information based on the output setting information table 28a. Specifically, when the "transaction classification" set to the output setting information table 28a is performed, the receipt information generating section 211 adds the transaction character string set as the "output condition" to the receipt information when the condition set as the "output condition" is satisfied.

The receipt information generating section 211 receives an input of the first identification code of the customer at any timing during one transaction. Specifically, when the first identification code is read through the code scanner 25, the receipt information generating section 211 determines that the first identification code is received. When the second identification code is received through the card reader 26, the receipt information generating section 211 inquires the first identification code corresponding to the second identification code of the company membership master. When the corresponding first identification code is obtained from the company membership master, the receipt information generating section 211 determines that the first identification code is received.

When the first identification code is received, the receipt information generating section 211 adds a character string (hereinafter, referred to as a flag character string) indicating that the first identification code is present to the receipt information. When the first identification code and the second identification code are received, the receipt information generating section 211 adds these identification codes to the receipt information.

Figure 13:
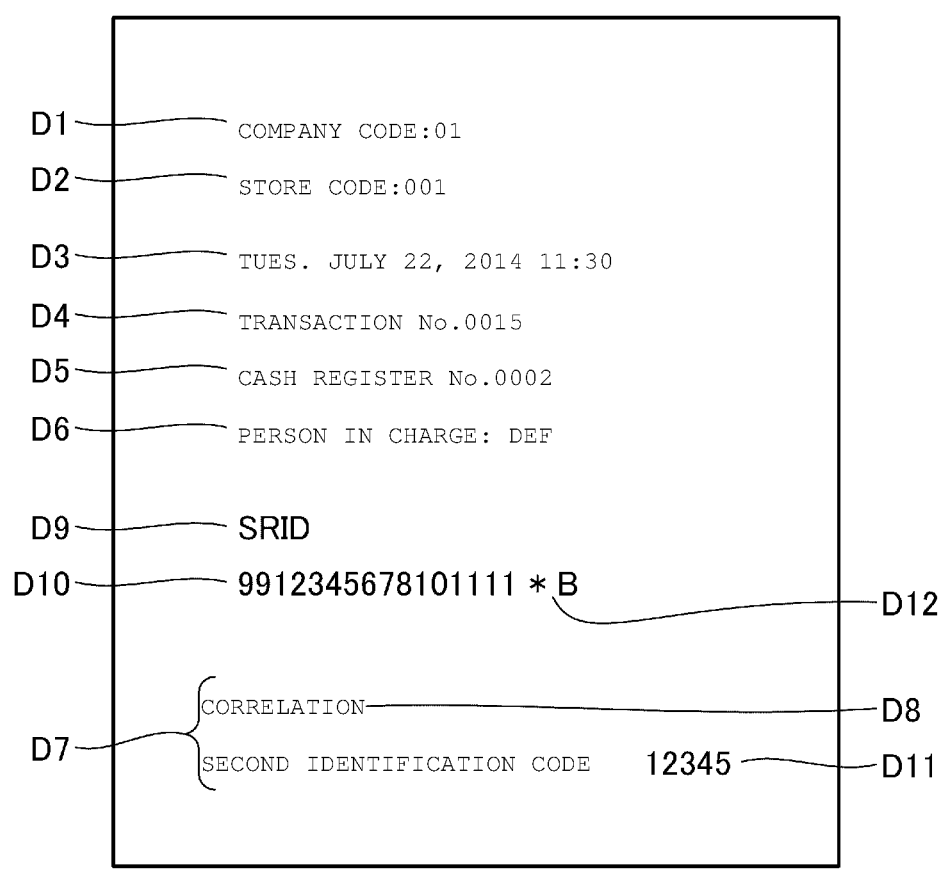

FIGS. 12 and 13 are schematic diagrams showing examples of the receipt information. Here, the receipt information is unstructured text data, and is used for printing by the printer 23.

As shown in FIGS. 12 and 13, the receipt information includes data elements such as a company code (company name) D1 of the company that operates the stores, a store code D2, transaction date and time D3, a transaction number (receipt number) D4, a cash register number D5, and the name of a casher D6.

The receipt information includes a data element of content according to the transaction classification. For example, when the merchandise sales registration is performed, the transaction content such as the merchandise name (merchandise code) or price of the registered merchandise, the total price of the merchandise, and deposit amount paid by the customer is included in a region D7, as shown in FIG. 12.

When the receipt information corresponds to the "transaction classification" and the "output condition" of the output setting information table 28a, the receipt information generating section 211 generates the receipt information including the transaction character string set as the "output condition", as shown in FIG. 13. Here, FIG. 13 illustrates an example of the receipt information generated when the correlation registration is performed. As shown in FIG. 13, when the correlation registration is performed, a character string of "correlation", is included in the receipt information as a transaction character string D8.

When the first identification code is input, the receipt information generating section 211 generates the receipt information including a flag character string D9 indicating that the first identification code is present, as shown in FIGS. 12 and 13. In FIGS. 12 and 13, a character string of "SRID" is used as the flag character string D9, but the present embodiment is not limited thereto.

When the first identification code or the second identification code is input, the receipt information generating section 211 generates the receipt information including a first identification code D10 and a second identification code D11 that indicate these identification codes. Specifically, FIG. 12 shows an example in which the first identification code is input, and the value thereof is included in the receipt information as the first identification code D10. FIG. 13 shows an example in which the first identification code and the second identification code are input, and the values thereof are included in the receipt information as the first identification code D10 and the second identification code D11, respectively.

The receipt information generating section 211 adds a command character string D12 to the last of the first identification code D10 in response to the indication from the operator. The command character string D12 is used to exceptionally indicate the output method of the receipt information.

For example, when the printing of the receipt information is indicated, the receipt information generating section 211 adds the command character string D12 (for example, "*A") indicating the printing to the last of the first identification code D10. When the printing of the receipt information and the transmitting (hereinafter, referred to as "transmission") of the receipt information as the electronic receipt information to an external device are indicated, the receipt information generating section 211 adds the command character string D12 (for example, "*B") indicating the printing and the transmission to the last of the first identification code D10.

In the present embodiment, the command character string D12 is added in response to the indication operation by the operator, but the present embodiment is not limited thereto. For example, a condition for adding the command character string D12 may be correlated with the added command character string D12, and the correlated information may be previously set as setting information.

In this case, a "case of an offline state" may be set as a condition, and the setting may be performed such that the command character string D12 indicating the "printing" is added. When this setting is adopted, even if the receipt information is supposed to be transmitted as the electronic receipt information to the external device, the sheet receipt is output in the offline state. In the present embodiment, the condition related to this offline state is set as the setting information.

A "case where the flag character string D9 is present" may be set as another condition, and the setting may be performed such that the command character string D12 indicating the "printing" or the "transmission" is added. The setting may be performed such that the command character string D12 is added for each transaction classification. The command character string D12 may be set as the transaction character string set to the "output condition" of the output setting information table 28a.

In the present embodiment, the electronic receipt information is transmitted when the command character string D12 is not added, but the present embodiment is not limited thereto. The transmission may be explicitly performed by the command character string D12. When neither the printing nor the transmission is not performed, the command character string D12 according to the command content may be added.

Referring back to FIG. 11, the output processing section 212 is a functional unit that outputs the receipt information generated by the receipt information generating section 211. As shown in FIG. 11, the output processing section 212 includes a state determining section 2121, a filer processing section 2122, a print outputting section 2123, and an electronic receipt outputting unit 2124.

The state determining section 2121 determines a communication state between the POS terminal and the external device in cooperation with the communication I/F 27. Here, the external device is a transmission destination of the electronic receipt information, such as the store server 3 or the company server 4. When the electronic receipt information is directly transmitted to the electronic receipt server 5, the communication state between the POS terminal and the electronic receipt server 5 may be checked.

For example, the state determining section 2121 determines whether or not the POS terminal is in an online state capable of communicating with the external device through polling. Here, when the communication between the POS terminal and the external device is not available due to a communication error, the state determining section 2121 determines that the communication state is an offline state. Here, a timing at which the communication state is checked is not particularly limited. For example, the communication state maybe checked at a predetermined time interval, or may be checked when the electronic receipt information is transmitted to the external device.

The filter processing section 2122 determines whether or not the specific character string is included in the receipt information, and determines the output method (output form) of the receipt information based on the determined result.

Specifically, the filter processing section 2122 determines whether or not the flag character string D9 (for example, "SRID") is included in the receipt information. Here, the flag character string D9 corresponds to a first character string.

When the flag character string D9 is not included in the receipt information, the filter processing section 2122 determines that the output of the sheet receipt is designated, and outputs the receipt information to the print outputting section 2123. Meanwhile, when the flag character string D9 is included in the receipt information, that is, when the first identification code is input, the filter processing section 2122 determines that the output of the electronic receipt (electronic receipt information) is designated. Subsequently, the filter processing section 2122 determines whether or not a predetermined numerical value (for example, "99") is included in the header part C11 of the first identification code D10.

When the predetermined numerical value is not included in the header part C11, it is difficult to use the first identification code D10 as the first identification code of the electronic receipt system. Thus, when the predetermined numerical value is not included in the header part C11, the filter processing section 2122 is excluded from an outputting target of the electronic receipt information by outputting the receipt information to the print outputting section 2123.

When the predetermined numerical value is included in the header part C11, the filter processing section 2122 determines whether or not the transaction character string D8 is included in the receipt information. Here, the transaction character string D8 corresponds to a second character string.

More specifically, the filter processing section 2122 determines whether or not any transaction character string D8 set to the "output condition" is included in the receipt information by referring to the output setting information table 28a. When the transaction character string D8 is included in the receipt information, the filter processing section 2122 outputs the receipt information according to the output method set in correlation with the transaction character string D8. Here, when the "printing" is set as the output method, the filter processing section 2122 determines that the output of the sheet receipt is designated, and outputs the receipt information to the print outputting section 2123. When the "transmission" is set as the output method, the filter processing section 2122 determines that the output of the electronic receipt information is designated, and outputs the receipt information to the electronic receipt outputting section 2124.

When the transaction character string D8 is not included in the receipt information, the filter processing section 2122 determines whether or not the command character string D12 is added to the last of the first identification code D10. Here, the command character string D12 corresponds to a third character string and a fourth character string.

When the command character string D12 is not added to the last of the first identification code D10, the filter processing section 2122 outputs the receipt information as a default setting to the electronic receipt outputting section 2124.

Meanwhile, when the command character string D12 is added, the filter processing section 2122 outputs the receipt information according to the command character string D12. Here, when the command character string D12 indicates the "printing", the filter processing section 2122 determines that the output of the sheet receipt is designated, and outputs the receipt information to the print outputting section 2123. When the command character sting D12 indicates both the "printing" and the "transmission", the filter processing section 2122 determines that both the output of the sheet receipt and the output of the electronic receipt information are designated. In this case, the filter processing section 2122 outputs the receipt information to both the print outputting section 2123 and the electronic receipt outputting section 2124.

For example, the print outputting section 2123 is a printer driver. When the receipt information is input from the filter processing section 2122, the print outputting section 2123 prints the receipt information on the sheet by controlling the printer 23.

For example, the electronic receipt outputting section 2124 is a network driver. When the receipt information is input from the filter processing section 2122, the electronic receipt outputting section 2124 converts the receipt information into a predetermined data format according to a predetermined conversion rule. The electronic receipt outputting section 2124 transmits (outputs) the receipt information of which the data format is converted, that is, the electronic receipt information to the company server 4 through the communication I/F 27. The electronic receipt information may be transmitted to the company server 4 through the store server 3, or may be directly transmitted to the company server 4. Alternatively, the electronic receipt information may be directly transmitted to the electronic receipt server 5.

Here, the electronic receipt information includes structured data (structured document) such as XML or CSV. The receipt information is converted into the electronic receipt information based on a predetermined conversion rule. Specifically, predetermined elements configuring the receipt information and attribute information (tags) indicating attributes of these elements are defined in the conversion rule. The electronic receipt outputting section 2124 generates structured electronic receipt information by structuring the respective elements of the receipt information using the corresponding attribute information. Since it is possible to efficiently use the elements included in the electronic receipt information when structured, it is possible to obtain various advantages in view of data management.

In the present embodiment, although the state determining section 2121 and the electronic receipt outputting section 2124 are separately provided, the electronic receipt outputting section 2124 may have a function of the state determining section 2121.

Figure 14:
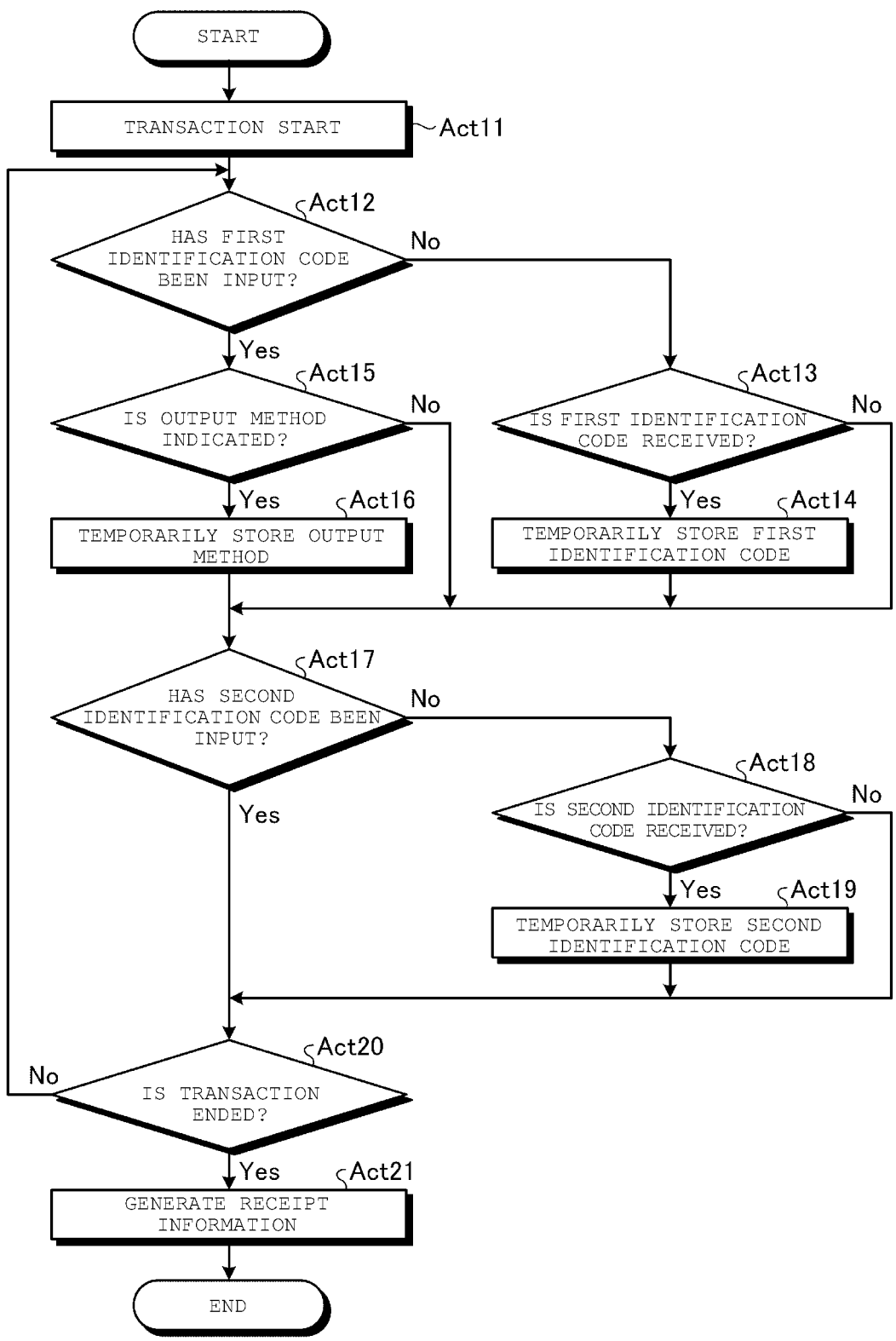
FIG. 14 is a flowchart of a receipt generating process performed by the POS terminal according to the first embodiment.

Hereinafter, the operation of the POS terminal 2 will be described with reference to FIGS. 14 and 15. Here, FIG. 14 is a flowchart showing an example of a receipt generating process performed by the POS terminal 2. The state determining section 2121 determines the communication state in the background of this process.

First, when the transaction classification is designated as an executing target by the operator, the receipt information generating section 211 of the POS terminal 2 starts the process according to the transaction classification (Act 11). For example, when the "sales registration" is designated as the transaction classification, the receipt information generating section 211 starts to perform the merchandise sales registration. When the "correlation registration" is designated as the transaction classification, the receipt information generating unit starts the process of performing the correlation registration.

Subsequently, the receipt information generating section 211 determines whether or not the first identification code has been input in advance (Act 12). When the first identification code has not been input (Act 12; No), the receipt information generating section 211 determines whether or not the first identification code is received (Act 13). Here, when the first identification code is received (Act 13; Yes), the receipt information generating section 211 temporarily stores the first identification code in the RAM (Act 14), and the process proceeds to Act 17. Even when the first identification code is not received (Act 13; No), the process proceeds to Act 17.

Meanwhile, when the first identification code has been input in advance (Act 12; Yes), the receipt information generating section 211 determines whether or not the output method of the receipt information is indicated (Act 15). Here, the output method may be indicated by the operation of the operator or by predetermined setting information.

When the output method is indicated (Act 15; Yes), the receipt information generating section 211 temporarily stores the indicated output method in the RAM (Act 16), and the process proceeds to Act 17. Even when the output method is not indicated (Act 15; No), the process proceeds to Act 17.

Thereafter, the receipt information generating section 211 determines whether or not the second identification code has been input in advance (Act 17). Here, when the second identification code has been input (Act 17; Yes), the process proceeds to Act 20.

When the second identification code has not been input (Act 17; No), the receipt information generating section 211 determines whether or not the second identification code is received (Act 18). Here, when the second identification code is received (Act 18; Yes), the receipt information generating section 211 temporarily stores this second identification code in the RAM (Act 19), and the process proceeds to Act 20. Even when the second identification code is not received (Act 18; No), the process proceeds to Act 20.

When the first identification code corresponding to the second identification code is registered in the company membership master, the receipt information generating section 211 obtains this first identification code from the company membership master. In Act 13, it is determined that the input of the first identification code is received.

Subsequently, the receipt information generating section 211 determines whether or not the end of the transaction is indicated by the operation of the end key (Act 20). When the end of the transaction is not indicated (Act 20; No), the receipt information generating section 211 returns to Act 12, and waists for the input of the first identification code or the second identification code, and the indication input of the output method.

When the indication of ending the transaction is received in Act 20 (Act 20; Yes), the receipt information generating section 211 generates the receipt information according to this transaction content (Act 21), and ends the process.

Here, the specific character string according to the processed results of Act 11 to Act 19 is included in the receipt information generated in Act 21. Specifically, when the transaction classification of the transaction performed in Act 11 is set in the output setting information table 28a, the transaction character string is included in the receipt information. When the first identification code is received in Act 13, the flag character string D9 and the first identification code D10 are included in the receipt information. When the second identification code is received in Act 18, the second identification code D11 is included in the receipt information. When the indication of the output method is received in Act 15, the command character string D12 according to this output method is added to the last of the first identification code D10. When the communication state is the offline state, the command character string D12 indicating the "printing" is added to the last of the first identification code D10.

Figure 15:
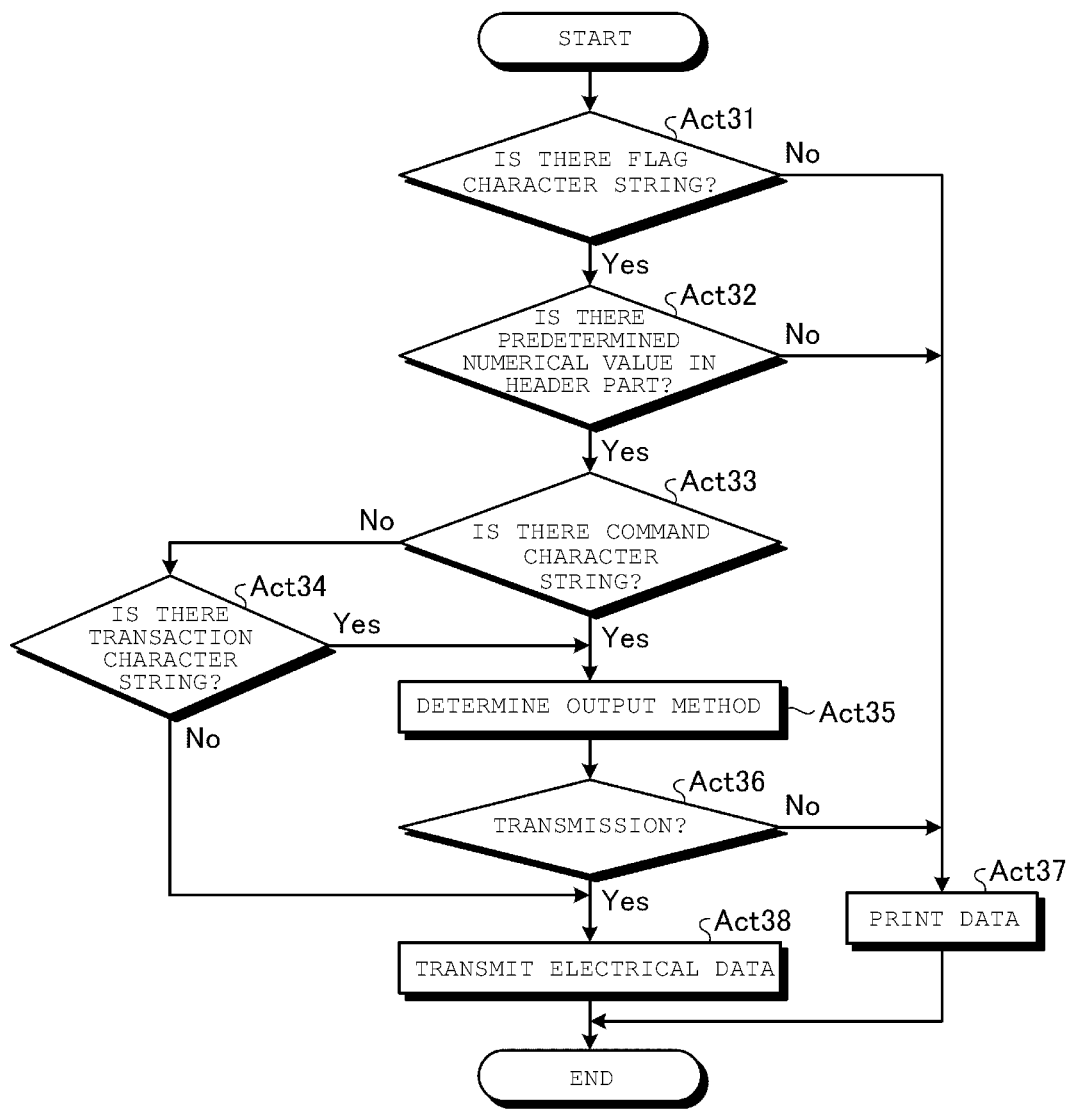
FIG. 15 is a flowchart of a receipt outputting process performed by the POS terminal according to the first embodiment.

FIG. 15 is a flowchart showing an example of a receipt outputting process performed by the POS terminal 2. This process is performed after the receipt generating process is performed.

The filter processing section 2122 analyzes the receipt information generated in the receipt generating process, and determines whether or not the specific character string is included in the receipt information. First, the filter processing section 2122 determines whether or not the flag character string D9 is included in the receipt information (Act 31). When the flag character string D9 is not included in the receipt information (Act 31; No), the filter processing section 2122 prints the receipt information on the sheet by outputting the receipt information to the print outputting section 2123 (Act 37).

When the flag character string D9 is included in the receipt information (Act 31; Yes), the filter processing section 2122 determines whether or not a predetermined numerical value is included in the header part C11 of the first identification code D10 (Act 32). When the predetermined numerical value is not included in the header part C11 (Act 32; No), the filter processing section 2122 prints the receipt by outputting the receipt information to the print outputting section 2123 (Act 37).

When the predetermined numerical value is included in the header part C11 (Act 32; Yes), the filter processing section 2122 determines whether or not the command character string D12 is added to the last of the first identification code D10 (Act 33). When the command character string D12 is added (Act 33; Yes), the filter processing section 2122 determines the output method indicated by the command character string D12 (Act 35).

When the command character string D12 is not added (Act 33; No), the filter processing section 2122 determines whether or not the transaction character string D8 set to the output setting information table 28a is included in the receipt information (Act 34). When the transaction character string D8 is included (Act 34; Yes), the filter processing section 2122 determines the process method according to the transaction character string D8 by referring to the output setting information table 28a (Act 35). When the transaction character string D8 is not included (Act 34; No), the filter processing section 2122 proceeds to Act 38.

As the determined result in Act 35, when the output method indicates the printing (Act 36; No), the filter processing section 2122 prints the receipt by outputting the receipt information to the print outputting section 2123 (Act 37).

Meanwhile, as the determined result of Act 35, when the output method indicates the transmission of the electronic receipt information (Act 36; Yes), the filter processing section 2122 proceeds Act 38. In Act 38, the filter processing section 2122 transmits the receipt information as the electronic receipt information to the external device by outputting the receipt information to the electronic receipt outputting section 2124 (Act 38). When the output method indicates both the printing and the transmission, the filter processing section 2122 performs both Act 37 and Act 38.

As described above, the POS terminal 2 according to the present embodiment generates the receipt information including the specific character string indicating the output method based on the indication from the operator or the predetermined setting information. The POS terminal 2 determines the output method of the receipt information according to the specific character string included in the receipt information. As described above, since the output method of the receipt information can be arbitrarily designated by the specific character string included in the receipt information, the POS terminal 2 can flexibly output the receipt information.

The POS terminal 2 according to the present embodiment can usability of the electronic receipt system by outputting the receipt according to the communication state with the external device. Specifically, even when the output of the electronic receipt information is designated, the POS terminal 2 outputs the receipt information from the printer 23 when the determined result of the state determining section 2121 is the offline state. Thus, the customer can check the transaction content of the transaction performed in the offline state by reviewing the sheet receipt.

Second Embodiment

In the first embodiment, when the communication state is the offline state, control is performed such that the sheet receipt is output by adding the command character string D12 indicating the "printing". In a second embodiment, when the communication state is the offline state, the sheet receipt is output by directly using the determined result of the state determining section 2121. In the second embodiment, the condition related to the offline state of the communication state is not set as the setting information. The same elements as those in the first embodiment will be assigned the same reference numerals, and the description thereof will be omitted.

Figure 16:
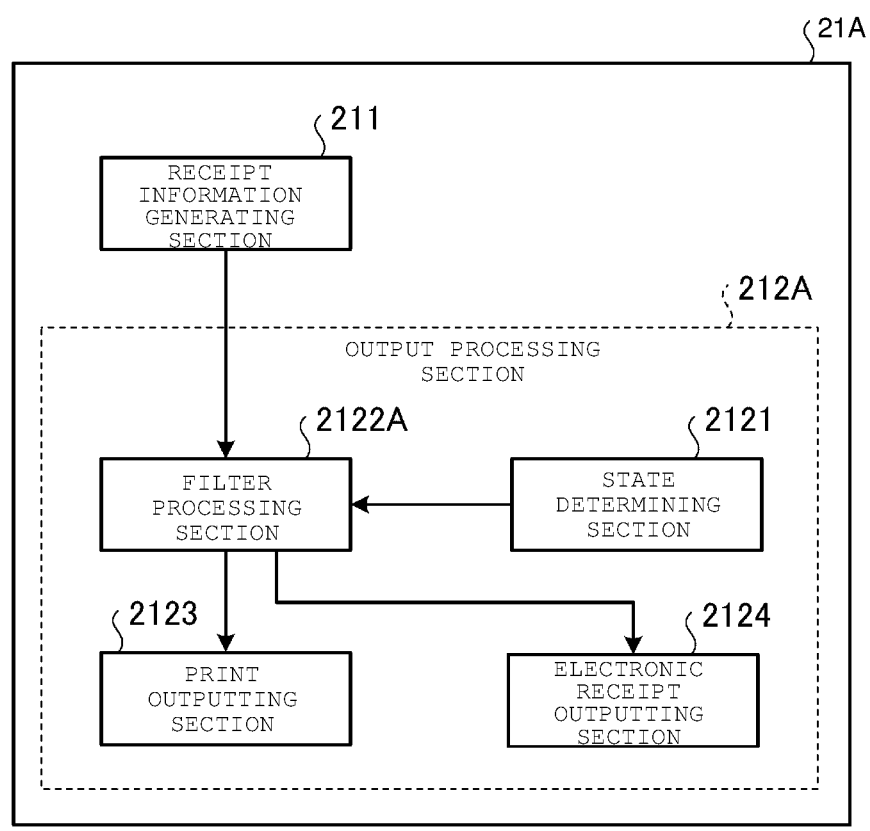
FIG. 16 is a block diagram of a functional configuration of a control unit in a POS terminal according to a second embodiment.

FIG. 16 is a block diagram of a functional configuration of a control unit 21A of a POS terminal according to the second embodiment. The control unit 21A includes a receipt information generating section 211, and an output processing section 212A. Further, the output processing section 212A includes a state determining section 2121, a filter processing section 2122A, a print outputting section 2123, and an electronic receipt outputting section 2124.

Similarly to the filter processing section 2122, the filter processing section 2122A determines the output method of the receipt information based on the specific character string included in the receipt information.

When the receipt information is output to the electronic receipt outputting section 2124, the filter processing section 2122A refers to the determined result of the state determining section 2121. Here, when the determined result of the state determining section 2121 is the online state, the filter processing section 2122A outputs the receipt information to the electronic receipt outputting section 2124.

Meanwhile, when the determined result of the state determining section 2121 is the offline state, the filter processing section 2122A notifies the operator that the communication state is the offline state. The notification method is not particularly limited, and, for example, notification information such as a message or an icon image indicating that the communication state is the offline state may be displayed on the display unit 24 (first display 24a). The filter processing section 2122A holds the output of the receipt information to the electronic receipt outputting section 2124 by temporarily storing the receipt information in the RAM. The filter processing section 2122A prints the receipt information on the receipt by outputting the receipt information to the electronic receipt outputting section 2124. When the determined result of the state determining section 2121 returns to the online state, the filter processing section 2122A transmits the temporarily stored receipt information to the external device by outputting the receipt information to the electronic receipt outputting section 2124.

As described above, when the POS terminal is in the offline state, the control unit 21A temporarily holds the transmission of the receipt information, and prints the receipt information instead. Thus, the customer can check the transaction content by reviewing the printed receipt for a period during which the electric receipt information.

Figure 17:
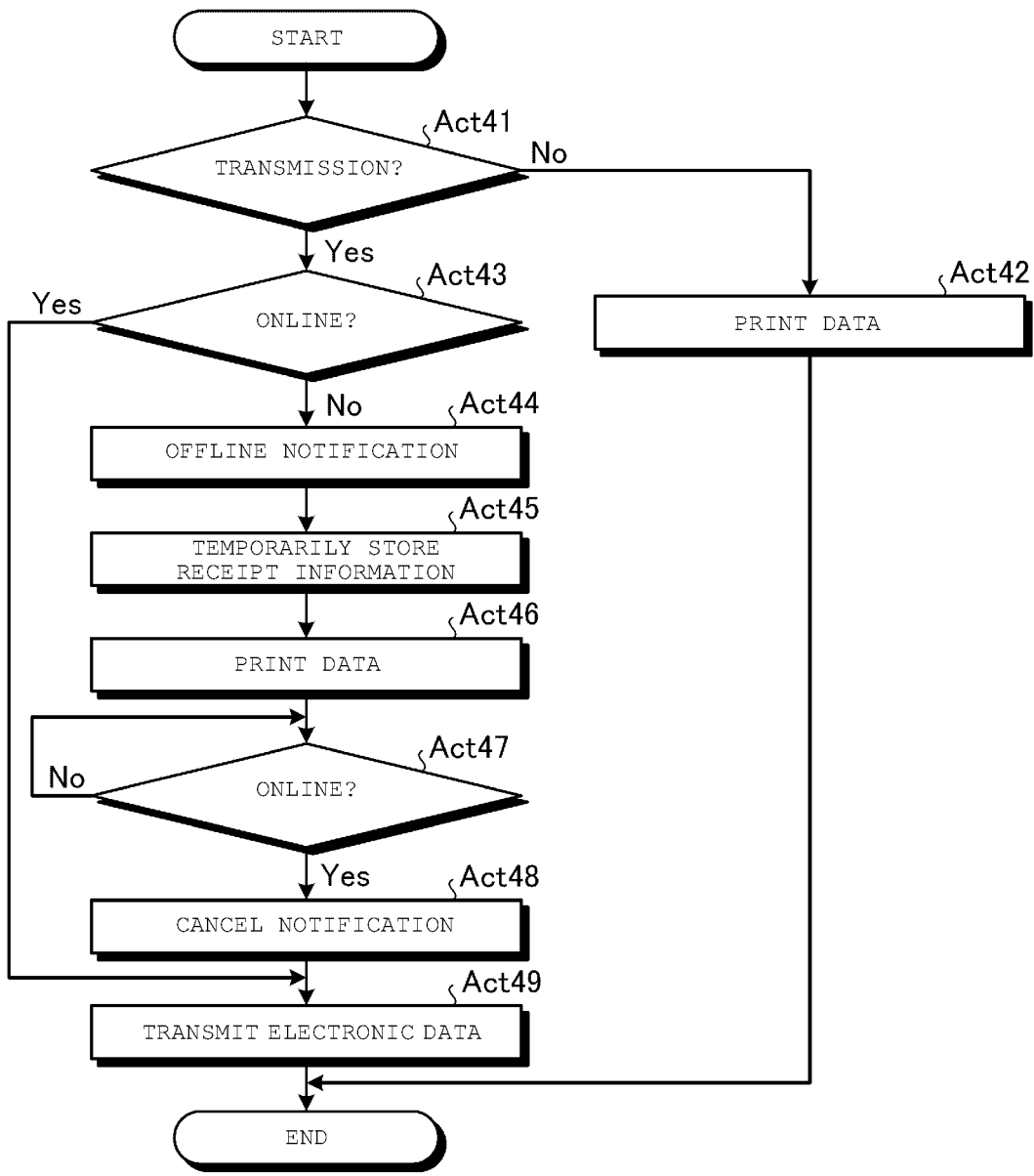
FIG. 17 is a flowchart of a receipt outputting process performed by the POS terminal according to the second embodiment.

FIG. 17 is a flowchart showing an example of a receipt outputting process performed by the control unit 21A. For example, this process is performed after the receipt generating process (See FIG. 14) described in the first embodiment has been performed. For example, this process corresponds to Act 36 to Act 38 of the receipt outputting process (see FIG. 15) described in the first embodiment. The state determining section 2121 determines the communication state in the background of this process.

First, the filter processing section 2122A determines the output method (output form) of the receipt information based on the specific character string included in the receipt information (Act 41). When it is determined that the sheet receipt is output (printed) (Act 41; No), the filter processing section 2122A outputs the sheet receipt by outputting the receipt information to the print outputting section 2123 (Act 42).

When it is determined that the electronic receipt information is output (transmitted) (Act 41; Yes), the filter processing section 2122A determines whether or not the communication state is the online state by referring to the determined result of the state determining section 2121 (Act 43). When the determined result is the online state (Act 43; Yes), the process proceeds to Act 49.

Meanwhile, when the determined result is the offline state (Act 43; No), the filter processing section 2122A displays notification information notifying that the communication state is the offline state on the display unit 24 (first display 24a) (Act 44). Subsequently, the filter processing section 2122A temporarily stores the receipt information in the RAM (Act 45). The filter processing section 2122A outputs the sheet receipt by outputting the receipt information temporarily stored in Act 45 to the print outputting section 2123 (Act 46).

Thereafter, the filter processing section 2122A waits until the determined result of the state determining section 2121 returns to the online state (Act 47; No). When the communication state is switched to the online state (Act 47; Yes), the filter processing section 2122A cancels the notification (Act 48), and the process proceeds to Act 49.

The filter processing section 2122A transmits the electronic receipt information to the external device by outputting the receipt information to the electronic receipt outputting section 2124 (Act 49), and ends this process.

When the output methods are both the printing and the transmission, the filter processing section 2122A performs both Act 42 and Act 49 (Act 43 to Act 49). In this case, when the POS terminal is in the offline state, Act 46 may be skipped such that the receipt is not repeatedly printed in Act 42 and Act 46.

As described above, the POS terminal according to the present embodiment can improve usability of the electronic receipt system by outputting the receipt according to the communication state with the external device. Specifically, even when the output of the electronic receipt information is designated, the POS terminal outputs the receipt information from the printer 23 when the determined result of the state determining section 2121 is the offline state. When the determined result of the state determining section 2121 is switched (returns) to the online state from the offline state, the POS terminal transmits the receipt information output onto the sheet receipt to the external device. Since the customer can check the transaction content by the sheet receipt for a period during which the electronic receipt information is supplied, it is possible to improve usability of the electronic receipt system.

While the embodiments of the present invention have been described, the present invention is not limited to these embodiments, and various changes, substitutions, additions, and combinations are possible without departing from the gist of the present invention. Additional effects or modifications can be easily derived by those skilled in the art. Accordingly, a wider aspect of the present invention is not limited by the specific details and the representative embodiment represented and described above. Therefore, various changes are possible without departing from the spirit or the scope of the general concept of the present invention defined by the appended claims and their equivalents.

For example, although it is described in the above embodiments that the printing control device is applied to the POS terminal 2, an application target is not limited thereto.

Although it is described in the above embodiments that the output method is determined based on the plurality of elements such as the flag character string D9 or the command character string D12 included in the receipt information, the embodiments are not limited thereto. The output method may be determined based on a part of the elements. For example, the output method may be determined based on whether or not the flag character string D9 (or the first identification code) is included in the receipt information. When this configuration is adopted, the output setting information table 28a or the command character string D12 are not necessary in the POS terminal according to the second embodiment.

Although it is described in the first embodiment that the output method designated by the command character string is adopted preferentially to the output method designated by another specific character string, the embodiment is not limited thereto. For example, the output method designated by the transaction character string may be most preferentially adopted. When the plurality of specific character strings is included in the receipt information, the adopted output method may be determined based on a priority between the specific character strings that are set in advance.

Although it has been described in the second embodiment that the operator of the POS terminal 2 is notified that the communication state is the offline state is transmitted to by displaying the notification information on the display unit 24 (first display 24a), the notification information may be transmitted to the customer. For example, the filter processing section 2122 may notify the customer that the communication state is the offline state by displaying notification information on the display unit 24 (second display 24b). The filter processing section 2122 may notify through the sheet output by the printer 23 by outputting the receipt information and the notification information to the print outputting section 2123. For example, when the notification information is transmitted to the customer, the notification that the electronic receipt information is provided may be performed as soon as the communication state returns to the online state.

The configuration of the POS terminal according to the second embodiment which is related to the notification in the offline state may be applied to the POS terminal 2 according to the first embodiment. Further, the configuration of the POS terminal according to the second embodiment which is related to the operation at the time of returning to the online state may be applied to the POS terminal 2 according to the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A point-of-sale terminal, comprising:
a communication interface configured to transmit data over a network connection to an external server device;

a printer for printing receipts; and a processor configured to:

register items for purchase in a sales transaction;

receive a selection of a receipt delivery preference of a customer as either a user selection at the point-of-sale terminal or by retrieval of customer-specific settings from the external server device;

generate receipt printing data for the sales transaction, the receipt printing data being of an unstructured data format that can be accepted by the printer for printing of a paper receipt and including, as an internal component thereof, a command character string flag indicating the receipt delivery preference of the customer in the sales transaction;

detect an operating status of the network connection to the external server device; and select whether to transmit the receipt printing data to the printer or to an electronic receipt server based on the command character string flag in the generated receipt printing data and the detected operating status of the network connection, wherein the receipt printing data is transmitted to the printer when either the command character string flag in the generated receipt printing data indicates a paper receipt has been requested by the customer or the detected operating status of the network connection indicates the network connection is offline, the receipt printing data is transmitted as an electronic receipt to the electronic receipt server when both the command character string flag in the generated receipt printing data indicates the customer has requested the electronic receipt and the detected operating status of the network connection indicates the network connection is online, the processor is further configured to convert the receipt printing data from the unstructured data format to a structured data format that can be accepted by the electronic receipt server, and the unstructured data format is converted to the structured data format based on a preestablished conversion rule for the electronic receipt server.

2. The point-of-sale terminal according to claim 1, wherein:

the printer is connected to the processor through a bus.

3. The point-of-sale terminal according to claim 2, wherein the receipt printing data is generated as unstructured text data which the printer processes before printing.

4. The point-of-sale terminal according to claim 1, wherein the selection of the receipt delivery preference of the customer in the sales transaction is provided by association with a member identification number of the customer in a customer loyalty program.

5. The point-of-sale terminal according to claim 1, wherein the structured data format is XML or CSV.

6. The point-of-sale terminal according to claim 1, wherein the external server device is a store server.

7. The point-of-sale terminal according to claim 1, wherein the network connection is a local area network connection.

8. The point-of-sale terminal according to claim 1, wherein the communication interface detects the operating state of the network connection by polling.

9. A point-of-sale terminal, comprising:

a communication interface configured to transmit data over a network connection to an external server device;

a code scanner for scanning merchandise codes in a sales transaction;

a printer for outputting a printed receipt for the sales transaction;

a processor configured to:

register items for purchase in the sales transaction according to merchandise codes;

receive a selection of a receipt delivery preference of a customer as either a user selection at the point-of-sale terminal or by retrieval of customer-specific setting from the external server device;

generate receipt printing data for the sales transaction based, the receipt printing data being of an unstructured data format that can be accepted by the printer for printing a paper receipt and including, as an internal component thereof, a command character string flag indicating the receipt delivery preference of the customer in the sales transaction;

detect an operating status of the network connection to the external server device; and select whether to transmit the receipt printing data to the printer or an electronic receipt server based on the command character string flag in the generated receipt printing data and the detected operating status of the network connection, wherein the receipt printing data is transmitted to the printer when either the command character string flag in the generated receipt printing data indicates a paper receipt has been requested by the customer or the detected operating status of the network connection indicates the network connection is offline, the receipt printing data is transmitted as an electronic receipt to the electronic receipt server when both the command character string flag in the generated receipt printing data indicates the customer has requested the electronic receipt and the detected operating status of the network connection indicates the network connection is online, the processor is further configured to convert the receipt printing data from the unstructured data format to a structured data format that can be accepted by the electronic receipt server, and the unstructured data format is converted to the structured data format based on a preestablished conversion rule for the electronic receipt server.

10. The point-of-sale terminal according to claim 9, wherein the receipt printing data is generated as unstructured text data which the printer processes before printing as a paper receipt.

11. The point-of-sale terminal according to claim 9, wherein the selection of the receipt delivery preference of the customer in the sales transaction is provided by association with a member identification number of the customer in a customer loyalty program.

12. The point-of-sale terminal according to claim 9, wherein the structured data format is XML or CSV.

13. The point-of-sale terminal according to claim 9, wherein the network connection is a local area network connection.

14. The point-of-sale terminal according to claim 9, wherein the communication interface detects the operating state of the network connection by polling.

* * * * *